(12) United States Patent
Nabei et al.

(10) Patent No.: US 10,758,954 B2
(45) Date of Patent: Sep. 1, 2020

(54) METHOD FOR IMMOBILIZING ARSENIC, AND ARSENIC-CONTAINING VITRIFIED WASTE

(71) Applicant: MITSUBISHI MATERIALS CORPORATION, Tokyo (JP)

(72) Inventors: Atsuhiro Nabei, Iwaki (JP); Rinato Miruvariefu, Iwaki (JP); Satoshi Okada, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 160 days.

(21) Appl. No.: 16/064,153

(22) PCT Filed: Dec. 21, 2016

(86) PCT No.: PCT/JP2016/088108
§ 371 (c)(1),
(2) Date: Jun. 20, 2018

(87) PCT Pub. No.: WO2017/110877
PCT Pub. Date: Jun. 29, 2017

(65) Prior Publication Data
US 2018/0354840 A1    Dec. 13, 2018

(30) Foreign Application Priority Data

Dec. 23, 2015 (JP) ................. 2015-250760

(51) Int. Cl.
*B09B 1/00* (2006.01)
*B09B 3/00* (2006.01)
(Continued)

(52) U.S. Cl.
CPC ............. *B09B 3/005* (2013.01); *C02F 1/62* (2013.01); *C02F 1/72* (2013.01); *C02F 11/00* (2013.01);
(Continued)

(58) Field of Classification Search
CPC .................... B09B 3/005; C03C 1/00
See application file for complete search history.

(56) References Cited

U.S. PATENT DOCUMENTS

| 5,281,790 A | 1/1994 | Nguyen Handfield et al. |
| 5,649,894 A | 7/1997 | White et al. |

(Continued)

FOREIGN PATENT DOCUMENTS

| CN | 101784489 A | 7/2010 |
| CN | 102965517 A | 3/2013 |

(Continued)

OTHER PUBLICATIONS

Singh T S et al., "Solidification/stabilization of arsenic containing solid wastes using portland cement, fly ash and polymeric materials", Journal of Hazardous Materials, Elsevier, Amsterdam, NL, vol. 131, No. 1-3, Apr. 17, 2006, pp. 29-36.(cited in the Jun. 11, 2019 Search Report issued for EP16878764.6).

(Continued)

*Primary Examiner* — Janine M Kreck
(74) *Attorney, Agent, or Firm* — Locke Lord LLP; James E. Armstrong, IV; Nicholas J. DiCeglie, Jr.

(57) ABSTRACT

A method for immobilizing arsenic includes adding calcium arsenate to a glass-forming material containing iron, silica, and alkaline components so that an iron/silica weight ratio is in a range of 0.5 to 0.9 and an amount of alkaline components is in a range of 14 wt % to 26 wt %, and thereby incorporating the arsenic into a glass solidified body. For example, the method for immobilizing arsenic may include: adding an alkaline solution and an oxidizing agent to a copper-arsenic-containing substance, and thereby carrying out an oxidizing leaching; separating a leach residue by solid-liquid separation; adding calcium hydroxide to a recovered alkaline arsenate solution to generate calcium arsenate; and adding the glass-forming material to the recov- (Continued)

ered calcium arsenate so that the iron/silica weight ratio and the amount of alkaline components are in the above-mentioned ranges, and thereby incorporating the arsenic into the glass solidified body.

3 Claims, 1 Drawing Sheet

(51) Int. Cl.
```
C22B 30/04      (2006.01)
C02F 11/00      (2006.01)
C02F 1/62       (2006.01)
C22B 7/00       (2006.01)
C22B 3/12       (2006.01)
C22B 3/22       (2006.01)
C02F 1/72       (2006.01)
C03C 1/00       (2006.01)
C03C 3/062      (2006.01)
C02F 101/10     (2006.01)
C25C 1/12       (2006.01)
```

(52) U.S. Cl.
CPC ............. *C03C 1/002* (2013.01); *C03C 3/062* (2013.01); *C22B 3/12* (2013.01); *C22B 3/22* (2013.01); *C22B 7/006* (2013.01); *C22B 30/04* (2013.01); *C02F 2101/103* (2013.01); *C25C 1/12* (2013.01); *Y02P 10/234* (2015.11)

(56) References Cited

U.S. PATENT DOCUMENTS

| | | | |
|---|---|---|---|
| 8,998,790 B2 | 4/2015 | Lalancette et al. | |
| 9,981,295 B2 * | 5/2018 | Lalancette | C22B 1/11 |
| 2014/0107389 A1 * | 4/2014 | Lalancette | C03C 3/087 |
| | | | 588/256 |

FOREIGN PATENT DOCUMENTS

| | | |
|---|---|---|
| CN | 103255289 A | 8/2013 |
| CN | 104911358 A | 9/2015 |
| JP | 2014-208581 A | 11/2014 |
| WO | 2014/059535 A1 | 4/2014 |

OTHER PUBLICATIONS

Supplementary European Search Report dated Jun. 11, 2019, issued for the European patent application No. 16878764.6.

Shan Taoyun et al. "Study on harmless treatment and resource technology of arsenic-containing mixed salt," Mineral Resources and Geology, vol. 27, Oct. 31, 2013, pp. 68-71. (cited in the Jul. 26, 2019 Office Action issued for CN201680073830.4).

Office Action dated Jul. 26, 2019, issued for the Chinese patent application No. 201680073830.4 and English translation thereof.

P.M. Swash et al., "Comparison of Solubilities of Arsenic-Bearing Wastes from Hydrometallurgucal and Pyrometallurgical Processes", Paper presented at GDMB Seminar "Slags in Metallurgy (Schlacken in der Metallurgie)" Aachen, Germany, Mar. 17-19, 1999, 9 pages. (discussed in the spec and cited in the ISR).

Timmons, Dale M. et al., "Vitrification Tested on Hazardous Wastes", Pollution Engineering, Jun. 1990, vol. 22, No. 6, ISSN 0032-3640, pp. 76-81 (cited in the ISR).

Hiroto Otaki et al., "Development of Heavy Weight-FRCC using copper slag", Proceedings of AIJ Tohoku chapter architectural research meeting, Jun. 2014, Kozo-kei, No. 77, ISSN 13456687, pp. 157-160. (cited in the ISR which serves as a concise explanation if relevance).

International Search Report dated Mar. 21, 2017, issued for PCT/JP2016/088108 and English translation thereof.

* cited by examiner

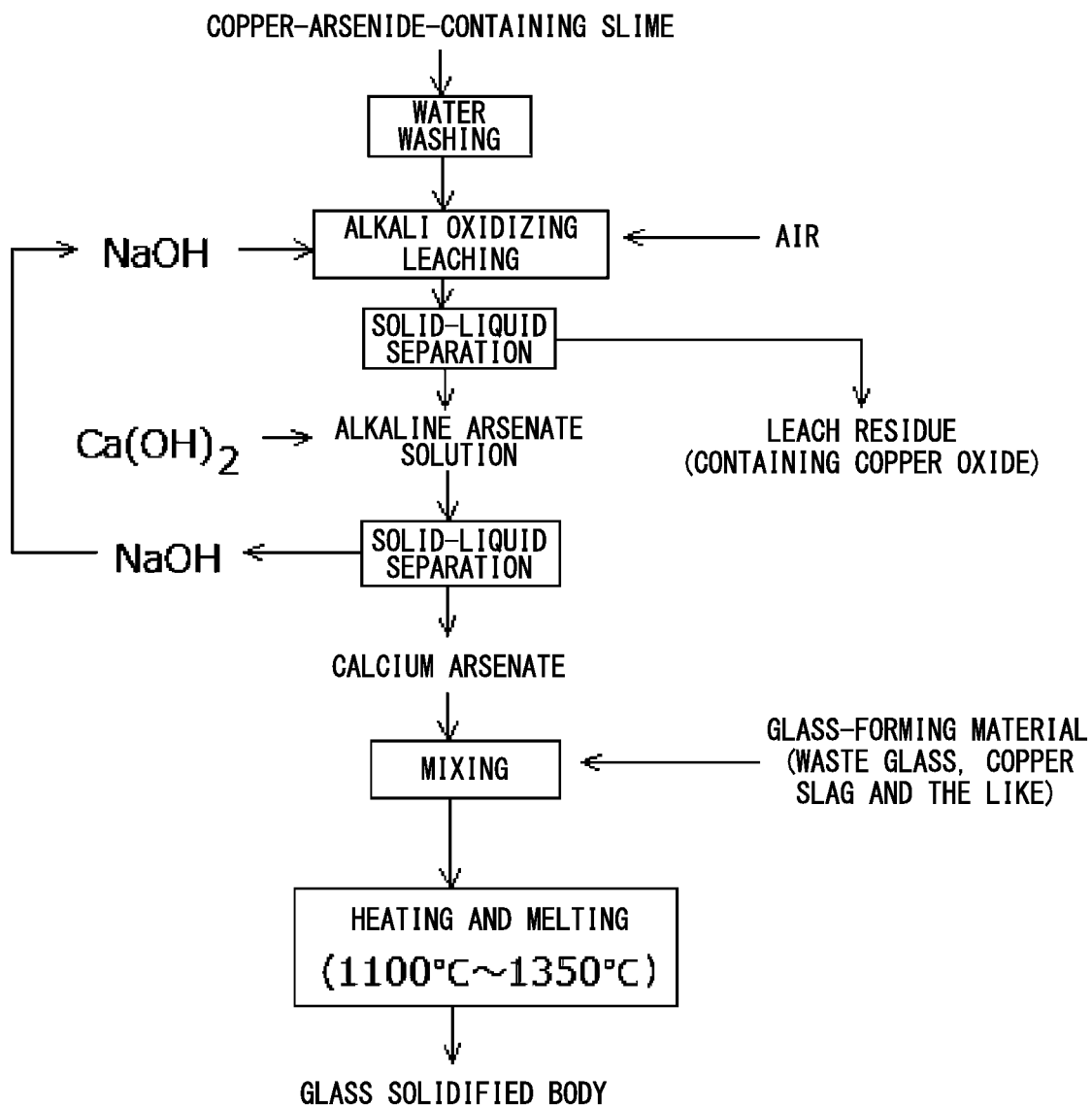

though arsenic has been converted into glass. Among these, iron arsenic sludge has a relatively low solubility product in neutral to alkaline conditions, so it is a stable compound and its handling is relatively easy. At the acidic solution was put in a furnace and was heated and melted. After that, the hot solution was subjected to gradual cooling to prepare a glass solidified body.

The hot-sides prepare be included in the inventive concept for iron arsenic sludge. But in the present invention, the iron arsenic sludge is also one of the raw materials, which has arsenic removed from the copper smelting system.

As described above, the conventional techniques have been related to stabilization methods based on low solubility, and the technique for producing a solid body excellent in mass disposability and storage stability has not been established. Even in the technique of Patent Document 2 where a solid body is produced by fusion, the process of producing the raw material for vitrification is complicated, and thereby, the processing cost is high. It is a problem yet to be solved, especially in view of the amount of copper smelting intermediates from which arsenic is necessarily removed, that a method of arsenic immobilization capable of large-volume treatment at low cost has not been established.

METHOD FOR IMMOBILIZING ARSENIC, AND ARSENIC-CONTAINING VITRIFIED WASTE

TECHNICAL FIELD

The present invention relates to a method for immobilizing arsenic to incorporate the arsenic into a glass solidified body (vitrified waste) in which the arsenic elution amount is suppressed below the environmental standard, and the present invention also relates to an arsenic-containing glass solidified body (arsenic-containing glass, arsenic-containing vitrified waste). More specifically, the present invention relates to an arsenic immobilization method capable of suppressing the arsenic elution amount below the environmental standard by converting (incorporating) calcium arsenate recovered from smelting intermediates or the like into a glass solidified body, and the present invention also relates to an arsenic-containing glass solidified body obtained by the above-described method. The method for immobilizing arsenic of the present invention is suitable as a method for treating a copper-arsenide-containing slime (slime containing copper arsenide) which is generated in a copper electrolytic refining step.

The present application claims priority on Japanese Patent Application No. 2015-250760 filed on Dec. 23, 2015, the content of which is incorporated herein by reference.

BACKGROUND ART

In electrolytic refining of copper, copper and arsenic gradually accumulate in the electrolytic solution. For this reason, a part of the electrolytic solution is extracted and subjected to an electrolyte purification. At the time of this electrolyte purification, a copper-arsenide-containing slime ($Cu_3As$ and the like) is extracted. The copper-arsenide-containing slime generally contains 40 to 60 mass % of copper, 20 to 40 mass % of arsenic, and 0.5 to 5 mass % of each of lead, tin, antimony, bismuth and the like. Therefore, after impurities such as arsenic are removed, the copper-arsenide-containing slime is returned to the copper smelting step and then the copper is recovered from the copper-arsenide-containing slime. Meanwhile, impurities such as arsenic are gradually accumulated in the copper smelting and refinery system and adversely influence on the copper quality, thus these impurities are to be removed outside the copper smelting and refinery system.

As a method for immobilizing arsenic, in which the arsenic contained in the copper-arsenide-containing slime or the like is incorporated into a stable compound and the arsenic is removed outside the copper smelting system, for example, the following treatment methods are conventionally known.

In the method disclosed in Patent Document 1, at first, a sodium hydroxide solution is added to a copper-arsenic-containing substance (substance containing copper and arsenic). The mixture is heated while the air is blown into the mixture; and thereby, alkaline oxidizing leaching is carried out. After the leaching is finished, a pH value of the treated solution is adjusted to 7.5 to 10. The treated solution is subjected to a solid-liquid separation to be separated into a leach residue containing copper and a solution containing arsenic. Next, a ferric compound is added to the solution containing arsenic so that a Fe/As molar ratio is in a range of 0.9 to 1.1, and thereby, a FeAs precipitate is formed. The FeAs precipitate recovered by solid-liquid separation is mixed with a sulfuric acid solution to prepare an acidic slurry or acidic solution. Next, the slurry or the solution is subjected to a heat treatment to form crystalline scorodite ($FeAsO_4 \cdot 2H_2O$), and thereby, the arsenic is immobilized.

In the method disclosed in Patent Document 2, at first, arsenic-containing smoke ash (dust) is leached with water under heating to extract arsenous acid ($As_2O_3$). Next, an oxidizing agent (manganese peroxide and the like) and calcium hydroxide (slaked lime) are added to a filtrate and reacted mutually. As a result, calcium arsenate is produced and recovered. Next, calcium arsenate is mixed with recycled glass powder, and the mixture is melted at 1200° C. to produce an arsenic-containing glass solidified body.

In the method disclosed in Patent Document 3, first, a sodium-based alkaline residue containing arsenic and antimony is heated at a temperature of 850° C. to 1200° C., and antimony is selectively reduced and separated by a carbon-based reducing agent. Next, a glass component is added to residual sodium arsenate, and the mixture is heated and melted to produce a glass solidified body of the arsenic.

According to the method described in Non-Patent Document 1, a $CaO-SiO_2$-based slag and calcium arsenate are heated and melted at 1400° C. under a constant oxygen partial pressure to produce a glass solidified body of the arsenic.

PRIOR ART DOCUMENTS

Patent Documents

Patent Document 1: Japanese Unexamined Patent Application, First Publication No. 2014-208581
Patent Document 2: PCT International Publication No. WO2014/059535A1
Patent Document 3: Chinese Unexamined Patent Application, First Publication No. 102965517A Non-Patent Document

[Non-Patent Document 1] Paper presented at GDMB Seminar, "Slags in Metallurgy (Schlacken in der Metallurgie)", P. M. SWASH et al., Aachen, Germany, 17-19 March, 1999.

DISCLOSURE OF THE INVENTION

Problems to be Solved by the Invention

The treatment method of Patent Document 1 has an advantage that arsenic is immobilized as scorodite, the arsenic concentration in the scorodite is high, and the conversion efficiency from an iron arsenic precipitate of intermediate product to the scorodite is excellent. On the other hand, since expensive ferric salt is used for producing the iron arsenic precipitate, the cost tends to increase. Moreover, after synthesizing the scorodite, adhered arsenic is removed by washing with water and a drainage containing arsenic is generated, which increases the processing cost. Furthermore, scorodite has a small bulk specific gravity of about 1, thus if it is discarded in the state of scorodite, it requires a larger volume of the disposal site.

In the treatment method of Patent Document 2, arsenic-containing smoke ash (dust) is leached with water and an arsenous acid solution is separated by filtration. Magnesium oxide and calcium hydroxide are added to the arsenous acid solution to produce calcium arsenate. These steps are troublesome and costly. In addition, there is a problem that immobilization of the arsenic contained in the glass solidified body is not sufficient.

The treatment method of Patent Document 3 is a method of vitrifying sodium arsenate. Since arsenic oxide volatilizes at a temperature of 1000° C. or more, it is difficult to treat exhaust gas.

The treatment method of Non-Patent Document 1 requires proper control of oxygen partial pressure in order to vitrify calcium arsenate under a constant oxygen partial pressure using a CaO—SiO$_2$-based slag, and therefore, there is a problem that it is difficult to control the actual operation.

The present invention provides a method for immobilizing arsenic which solves the above-mentioned problems in the conventional treatment methods for vitrifying and immobilizing arsenic and an arsenic-containing glass solidified body obtained by the method. According to the present invention, it is possible to vitrify and immobilize arsenic effectively and easily, and the elution amount of arsenic contained in the glass solidified body can be reduced below the Japanese environmental standard.

Solutions for Solving the Problems

Aspects of the present invention relate to a method for immobilizing arsenic and an arsenic-containing glass solidified body having the following features (hereinafter referred to as "arsenic immobilization method of the present invention" and "arsenic-containing glass solidified body of the present invention").

[1] A method for immobilizing arsenic, including: adding calcium arsenate to a glass-forming material containing iron, silica and alkaline components so that an iron/silica weight ratio is in a range of 0.5 to 0.9 and an amount of alkaline components is in a range of 14 wt % to 26 wt %, and thereby incorporating the arsenic into a glass solidified body.

[2] The method for immobilizing arsenic as described in [1], further including: adding an alkaline solution and an oxidizing agent to a copper-arsenic-containing substance, and thereby carrying out an oxidizing leaching; separating a leach residue by solid-liquid separation; adding calcium hydroxide to a recovered alkaline arsenate solution to generate calcium arsenate; and adding the glass-forming material to the recovered calcium arsenate so that the iron/silica weight ratio and the amount of alkaline components are in the ranges, and thereby incorporating the calcium arsenate into the glass solidified body.

[3] The method for immobilizing arsenic as described in [2], wherein the copper-arsenic-containing substance is a copper-arsenide-containing slime, sodium hydroxide and the oxidizing agent are added to the copper-arsenide-containing slime, a mixture is heated to leach the arsenic, and meanwhile the leach residue is separated by solid-liquid separation, calcium hydroxide is added to a recovered sodium arsenate solution to generate calcium arsenate, and the glass-forming material is added to the recovered calcium arsenate so that the iron/silica weight ratio and the amount of alkaline components are in the ranges, and thereby incorporating the calcium arsenate into the glass solidified body.

[4] The method for immobilizing arsenic as described in [3], wherein calcium hydroxide is added to the sodium arsenate solution to generate calcium arsenate, a solution containing the calcium arsenate is subjected to solid-liquid separation to recover the calcium arsenate, and meanwhile a filtrate containing sodium hydroxide is returned to an oxidizing leaching step to reuse the filtrate as an alkaline source for oxidizing leaching.

[5] An arsenic-containing glass solidified body, wherein an amount of arsenic is 5 wt % to 15 wt %, an iron/silica weight ratio is 0.5 to 0.9, and a total amount of Na$_2$O and CaO, which are alkaline components, is 14 wt % to 26 wt %.

Effects of the Invention

Since the glass solidified body produced by the arsenic immobilization method of the present invention can be stored for a long term as a mold, the glass solidified body can be stably stored without scattering like scorodite which is a powder.

According to the arsenic immobilization method of the present invention, in a glass solidified body using a waste glass, the arsenic concentration in the glass solidified body can be increased to 13 wt % or more. In a glass solidified body using copper slag, the arsenic concentration in the glass solidified body can be increased to 11 wt % or more. Both of these glass solidified bodies have smaller volume than that of scorodite, and therefore, it is possible to effectively utilize the limited volume of the final disposal site.

In the arsenic immobilization method of the present invention, sodium arsenate is recovered by oxidizing leaching using sodium hydroxide. Calcium arsenate produced by adding calcium hydroxide to the recovered sodium arsenate solution can be used. In this case, the formation of sodium hydroxide occurs together with the formation of calcium arsenate, and therefore, most of the sodium hydroxide can be recycled back to the leaching process. As a result, the sodium hydroxide can be efficiently used and its consumption can be reduced.

The arsenic immobilization method of the present invention is a method of vitrifying and immobilizing calcium arsenate. It is not a method in which an iron arsenic precipitate produced by adding a ferric compound to an alkaline arsenate solution is targeted as in the conventional method. Thus, the expensive ferric compound is not used, and the processing cost can be reduced.

Unlike scorodite, it is not necessary to wash the arsenic-containing glass solidified body produced by the arsenic immobilization method of the present invention with water. Since the amount of arsenic in the waste liquid is small, the burden of waste liquid treatment is reduced.

Moreover, since lots of the waste glasses contain a small amount of arsenic, there are difficult to recycle and most of them have to be landfilled. According to the arsenic immobilization method of the present invention, the arsenic concentration in the glass solidified body can be increased, thus it is possible to effectively utilize the limited volume of the final disposal site rather than the case where the waste glasses are landfilled as they are.

BRIEF DESCRIPTION OF THE DRAWINGS

FIG. 1 is a process chart showing processing steps of the present invention.

EMBODIMENTS FOR CARRYING OUT THE INVENTION

Hereinafter, embodiments of the arsenic immobilization method of the present invention and the arsenic-containing glass solidified body of the present invention will be described.

The arsenic immobilization method of the present invention is a method for immobilizing arsenic in which calcium arsenate is added to a glass-forming material containing iron, silica and alkaline components so that an iron/silica weight ratio is in a range of 0.5 to 0.9 and an amount of alkaline components is in a range of 14 wt % to 26 wt %, and thereby, the arsenic is incorporated into a glass solidified body.

As the calcium arsenate stated above, for example, it is possible to use calcium arsenate which is produced by a method including: adding an alkaline solution and an oxidizing agent to a copper-arsenic-containing substance (substance containing copper and arsenic) to carry out oxidizing leaching; and adding calcium hydroxide (slaked lime) to a recovered alkaline arsenate solution. As the copper-arsenic-containing substance, for example, a copper-arsenide-containing slime generated in copper electrolytic smelting can be used. As the alkaline solution, a sodium hydroxide solution can be used.

A copper-arsenide-containing slime generated in copper electrolytic smelting is recovered and washed with water. Next, sodium hydroxide is added to adjust a pH value to 7.5 or more, and further an oxidizing agent is added, and a mixture is heated to leach the arsenic. The leachate is subjected to solid-liquid separation to recover a sodium arsenate solution. Calcium hydroxide is added to the sodium arsenate solution to produce calcium arsenate. As calcium arsenate used in the arsenic immobilization method of the present invention, calcium arsenate recovered from the copper-arsenide-containing slime solution generated in such copper electrolytic refining can be used. Steps of recovering calcium arsenate from the copper-arsenide-containing slime solution and vitrifying calcium arsenate will be described below. These steps are also shown in FIG. 1.

[Alkaline Oxidizing Leaching Step]

The alkaline solution and the oxidizing agent are added to the copper-arsenide-containing slime to leach the arsenic. In this alkaline oxidizing leaching, the pH of the solution is preferably 7.5 or more. As the oxidizing agent, air, oxygen, chlorine, a chlorine compound or the like can be used. Air or oxygen may be blown into the solution in the form of microbubbles. The heating temperature for oxidizing leaching is preferably 90° C. or less.

In the oxidizing leaching using a sodium hydroxide solution as the alkaline solution, as represented by the following Formula [1], copper arsenide is oxidized in the sodium hydroxide solution. Copper forms copper oxide or copper hydroxide to generate a solid residue, and arsenic forms sodium arsenate and leaches into the solution.

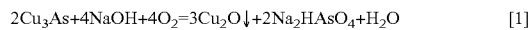
$$2Cu_3As+4NaOH+4O_2=3Cu_2O\downarrow+2Na_2HAsO_4+H_2O \quad [1]$$

In the case where a pH value of the alkaline oxidizing leaching is less than 7.5, for example, a trace amount of copper ions and arsenic (V) ions react to precipitate copper arsenate [$Cu_3(AsO_4)_2$], and thereby, the arsenic concentration in the solution decreases. In the case where sodium hydroxide is added to adjust the pH to 7.5 or more, leaching of arsenic proceeds. Therefore, it is preferable to carry out oxidizing leaching by adjusting pH to 7.5 or more.

As shown in the reaction formula [1] stated above, 2 mols of sodium hydroxide are consumed during the oxidative leaching of 1 mol of arsenic, thus the addition amount of NaOH may be adjusted based on a molar ratio of NaOH/As being 2 (one equivalent). Moreover, in the case where the arsenic concentration in the raw material is apparent (known), the total amount of sodium hydroxide required may be added at the starting point of leaching. In this case, even if the liquid at the initial stage of leaching becomes strong alkaline (pH of about 14), the pH at the end point of leaching is set to be in a range of 7.5 to 10. Thereby, the concentration of heavy metal ions such as copper, lead and the like can be suppressed, and an arsenic leachate containing arsenic (V) of relatively high purity can be obtained.

The leaching temperature is preferably 30° C. to 90° C. In the case where it is less than 30° C., the leaching time becomes longer; and in the case where it exceeds 90° C., the generated amount of steam (vapor) is large and hence the heating cost is wasted.

According to the above-mentioned alkaline oxidizing leaching, arsenic is selectively leached from the copper-arsenide-containing slime, and separability from coexisting metals such as copper, lead and the like contained in the slime is good. In addition, the slurry after leaching has good filterability and can be filtered in a short time. Moreover, the grade of copper contained in the leach residue is as high as 80 to 85%, and it is easy to conduct a copper smelting treatment.

[Calcium Arsenate Production Step]

The leachate obtained by the alkaline oxidizing leaching is subjected to solid-liquid separation to remove leach residue containing copper oxide, and the filtrate which is the sodium arsenate solution is recovered. When calcium hydroxide is added to this sodium arsenate solution, calcium arsenate ($As_3Ca_5O_{13}H$) is produced as shown in the following Formula [2]. The calcium arsenate is recovered.

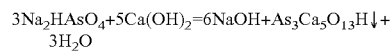
$$3Na_2HAsO_4+5Ca(OH)_2=6NaOH+As_3Ca_5O_{13}H\downarrow+3H_2O \quad [2]$$

In the calcium arsenate production step, as shown in the reaction formula [2] stated above, the amount of calcium hydroxide to produce calcium arsenate has a Ca/As molar ratio of 5/3. Therefore, calcium hydroxide may be added at an amount such that (so that) the molar ratio of Ca/As falls within a range of 1.7 to 2.0. In the case where the Ca/As molar ratio is 1.7 or less, a recovery rate of As decreases, and in the case where the Ca/As molar ratio is 2.0 or more, unreacted calcium hydroxide remains as an impurity, which is not preferable.

Since sodium hydroxide is produced together with calcium arsenate as shown in the reaction formula [2] stated above, sodium hydroxide contained in the filtrate which is obtained by solid-liquid separation of calcium arsenate is returned to the oxidizing leaching step for being reused as an alkaline source.

In the calcium arsenate production step, a pH of the solution is preferably 7.5 to 11, more preferably 9 to 10. In the case where the pH is less than 7.5, as shown in the following Formula [3], the sodium hydroxide concentration to be regenerated decreases, and in the case where the pH is 11 or more, the formation of calcium arsenate becomes insufficient, which is not preferable.

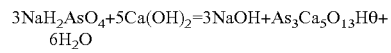
$$3NaH_2AsO_4+5Ca(OH)_2=3NaOH+As_3Ca_5O_{13}H\theta+6H_2O \quad [3]$$

The liquid temperature in the calcium arsenate formation step is preferably 50° C. to 70° C. In the case where the liquid temperature is less than 50° C., calcium arsenate is not sufficiently produced. In the case where the liquid temperature exceeds 70° C., crystalline calcium arsenate grows around the calcium hydroxide and inhibits the reaction, which is not preferable. The heating time is preferably 1 to 4 hours.

[Calcium Arsenate Vitrification Step]

A glass-forming material containing iron, silica and alkaline components is added to calcium arsenate so that (such that) the iron/silica weight ratio is in a range of 0.5 to 0.9 and the amount of alkaline components is in a range of 14 wt % to 26 wt %, and thereby, calcium arsenate is incorporated into a glass solidified body.

The iron/silica weight ratio is the ratio of the weight of iron contained in the glass-forming material to the weight of silica contained in the glass-forming material.

The weight percentage of the amount of alkaline components is the weight percentage of the alkaline components with respect to the total weight of the dry weight of calcium arsenate and the weight of the glass-forming material.

The term "weight" in this specification is used synonymously with the term "mass." Therefore, the weight ratio is the mass ratio, and wt % is mass %.

As the glass-forming material containing iron, silica and alkaline components, for example, a waste glass containing iron, silica, calcium and sodium, a copper slag and the like can be used. The waste glass and the copper slag are preferably mixed with silica sand or the like which is a silica source so that the iron/silica weight ratio and the amount of alkaline components fall within the ranges of the present invention. Moreover, the waste glass and the copper slag may be mixed and the mixture may be used.

The glass-forming material and calcium arsenate are mixed so that the iron/silica weight ratio ($Fe/SiO_2$) is in a range of 0.5 to 0.9 and the amount of alkaline components is in a range of 14 wt % to 26 wt % in the glass solidified body, and the mixture is heated and melted to produce the glass solidified body.

An iron component and a silica component in the glass solidified body are mainly an iron component and a silica component contained in the glass-forming material. Furthermore, the alkaline components in the glass solidified body are a Ca component of calcium arsenate, a Ca component and a Na component contained in the glass-forming material, and the like. The amount of alkaline components is the total amount of oxides of these alkaline components. In the glass solidified body containing sodium and calcium as the alkaline components, the amount of alkaline components is the total amount of $Na_2O$ and CaO.

In the case where the iron/silica weight ratio ($Fe/SiO_2$) in the glass solidified body is less than 0.5 or more than 0.9, the arsenic elution amount will exceed the environmental standard (0.3 ppm) in the elution test (dissolution test) of the glass solidified body (elution test according to Notification No. 13 of the Ministry of the Environment). In the case where the amount of alkaline components in the glass solidified body, for example, the total amount of $Na_2O$ and CaO is less than 14 wt %, the arsenic concentration becomes less than 5 wt %, and thereby economic advantages are reduced. In the case where it exceeds 26 wt %, the arsenic concentration becomes 15 wt % or more, which is not preferable because the elution amount of arsenic increases.

The upper limit of the heating temperature in the vitrification step is preferably 1400° C. In the case where the heating temperature is 1450° C. or more, calcium arsenate decomposes, arsenic oxide volatilizes and arsenic cannot be immobilized. On the other hand, the lower limit of the heating temperature is a temperature at which the mixture of calcium arsenate and glass-forming material melts. Generally, the temperature of the vitrification step is preferably 1000° C. to 1400° C., and more preferably 1100° C. to 1350° C. The heating and melting time may be about 15 minutes to 30 minutes. The heating device is not limited as long as the heating temperature becomes in the above-described range. In general, a melting furnace or the like can be used.

With regard to the arsenic-containing glass solidified body produced by the arsenic immobilization method of the present invention, it is preferable that the concentration of arsenic contained in the glass solidified body is in a range of 5 wt % to 15 wt %. In the case where the arsenic concentration in the glass solidified body is less than 5 wt %, economic advantages are hard to be obtained. On the other hand, in the case where the arsenic concentration in the glass solidified body exceeds 15 wt %, it is necessary to use calcium arsenate having a CaO concentration of 26 wt % or more, and thereby, the CaO concentration in the glass solidified body also increases. As a result, the amount of alkaline components will exceed the range of the amount of alkaline components in the treatment method according to the present invention, and thus the elution amount of arsenic increases.

Examples of treatment methods and arsenic-containing glass solidified body according to the present invention are shown below together with comparative examples.

Example 1

100 g (dry weight) of a copper-arsenide-containing slime (As: 30 wt %, Cu: 60 wt %) was mixed with 0.5 L of a caustic soda solution (NaOH concentration of 65 g/L), and the mixture was stirred and heated to 85° C. Oxidizing leaching was performed while blowing air at a rate of 1 L/min. The leachate was subjected to solid-liquid separation, and a sodium arsenate solution was recovered. 32 g of calcium hydroxide was added to 500 ml of this sodium arsenate solution (As: 39 g/L, pH 10, 50° C.) and the mixture was stirred for 4 hours to generate a white precipitate (calcium arsenate precipitate). The slurry after the precipitate was formed was subjected to solid-liquid separation, and 64 g (dry weight) of the calcium arsenate precipitate (As: 30 wt %, Ca: 35 wt %) and 500 ml of the filtrate (As: 20 ppm, NaOH: 41 g/l) were recovered.

A glass-forming material obtained by mixing copper slag and silica sand was added to the recovered calcium arsenate so that an iron/silica weight ratio and the amount of alkaline components (total amount of $Na_2O$ and CaO) were the values shown in Table 1, and thereby, mixed samples were prepared. These mixed samples were placed in crucibles and melted by heating at 1350° C. in the atmosphere for 30 minutes. The molten materials were cooled to recover the glass solidified bodies. These glass solidified bodies were subjected to the arsenic elution test (in compliance with Notification No. 13 of the Ministry of the Environment). The compositions of the glass solidified bodies and the results of the arsenic elution test are shown in Table 1 (Samples Nos. 1 to 6).

As shown in Table 1, in Samples Nos. 1 to 6 of the Examples, the iron/silica weight ratios were in a range of 0.5 to 0.9, the amounts of alkaline components were in a range of 14 wt % to 26 wt %, and the elution amounts of arsenic were suppressed to 0.28 ppm or less.

TABLE 1

| Sample No. | As (wt %) | Fe (wt %) | SiO$_2$ (wt %) | Fe/SiO$_2$ | CaO (wt %) | Na$_2$O (wt %) | Amount of alkaline components (wt %) | Arsenic elution concentration (mg/L) |
|---|---|---|---|---|---|---|---|---|
| 1 | 11.3 | 15.4 | 24.9 | 0.62 | 20.7 | — | 20.7 | 0.24 |
| 2 | 11.5 | 16.3 | 26.0 | 0.63 | 21.4 | 2.21 | 23.6 | 0.20 |
| 3 | 11 | 14.7 | 27.9 | 0.52 | 20.2 | 2.31 | 22.5 | 0.22 |
| 4 | 14.9 | 13.2 | 24.9 | 0.53 | 25.9 | — | 25.9 | 0.28 |
| 5 | 5.0 | 26.9 | 31.7 | 0.85 | 13.4 | 2.9 | 16.3 | 0.19 |
| 6 | 6.0 | 26.2 | 31.3 | 0.84 | 12.3 | 2.2 | 14.5 | 0.17 |

Example 2

A mixture of copper slag and waste glass was used as a glass-forming material, and the glass-forming material was added to the calcium arsenate recovered in Example 1 so that the iron/silica weight ratio and the amount of alkaline components (total amount of Na$_2$O and CaO) became the values shown in Table 1, and thereby, a mixed sample was prepared. This mixed sample was placed in a crucible and melted by heating at 1350° C. in the atmosphere for 30 minutes. The molten material was cooled to recover the glass solidified body. This glass solidified body was subjected to the arsenic elution test (in compliance with Notification No. 13 of the Ministry of the Environment). The composition of the glass solidified body and the result of the arsenic elution test are shown in Table 2 (Sample No. 21).

As shown in Table 2, in Sample No. 21 of the Example, the iron/silica weight ratio was in a range of 0.5 to 0.9, the amount of alkaline components was in a range of 14 wt % to 26 wt %, and the elution amount of arsenic was suppressed to 0.3 ppm or less.

TABLE 2

| Sample No. | As (wt %) | Fe (wt %) | SiO$_2$ (wt %) | Fe/SiO$_2$ | CaO (wt %) | Na$_2$O (wt %) | Amount of alkaline components (wt %) | Arsenic elution concentration (mg/L) |
|---|---|---|---|---|---|---|---|---|
| 21 | 10.4 | 14.9 | 27.4 | 0.54 | 20.9 | 3.0 | 23.9 | 0.2 |

Comparative Example 1

Copper slag to which silica sand was not added was used as a glass-forming material. The copper slag was added to the calcium arsenate recovered in Example 1 so that the iron/silica weight ratio and the amount of alkaline components (total amount of Na$_2$O and CaO) became the values shown in Table 3, and thereby, mixed samples were prepared. These mixed samples were heated and melted in the same manner as in Example 1 to produce glass solidified bodies. These glass solidified bodies were subjected to the arsenic elution test in the same manner as in Example 1. The compositions of the glass solidified bodies and the results of the arsenic elution test are shown in Table 3.

As shown in Table 3, since the copper slag used as the glass-forming material contained a large amount of an iron component, the iron/silica weight ratios became 0.9 or more, and therefore, even though the amounts of alkaline components were in a range of 14 wt % to 26 wt %, the elution amounts of arsenic were more than 0.3 ppm (Sample Nos. 31 and 32).

Comparative Example 2

Waste glass to which copper slag was not added was used as a glass-forming material. The waste glass was added to the calcium arsenate recovered in Example 1 so that the iron/silica weight ratio and the amount of alkaline components (total amount of Na$_2$O and CaO) became the values shown in Table 3, and thereby, a mixed sample was prepared. This mixed sample was heated and melted in the same manner as in Example 1 to produce a glass solidified body. This glass solidified body was subjected to the arsenic elution test in the same manner as in Example 1. The composition of the glass solidified body and the result of the arsenic elution test are shown in Table 3 (Sample No. 33).

As shown in Table 3, since the waste glass of the glass-forming material contained a large amount of alkaline components, the amount of alkaline components was more than 26 wt %, and the elution amount of arsenic was more than 0.3 ppm.

Comparative Example 3

Waste glass and copper slag were used as a glass-forming material. The waste glass was added to the calcium arsenate recovered in Example 1 so that the iron/silica weight ratio and the amount of alkaline components (total amount of Na$_2$O and CaO) became the values shown in Table 3, and thereby, a mixed sample was prepared. This mixed sample was heated and melted in the same manner as in Example 1 to produce a glass solidified body. This glass solidified body was subjected to the arsenic elution test in the same manner as in Example 1. The composition of the glass solidified body and the result of the arsenic elution test are shown in Table 3 (Sample No. 34).

As shown in Table 3, the amount of alkaline components was more than 26 wt %, and therefore, even though the iron/silica weight ratio was in a range of 0.5 to 0.9, the elution amount of arsenic was more than 0.3 ppm (Sample No. 34).

TABLE 3

| Sample No. | As (wt %) | Fe (wt %) | $SiO_2$ (wt %) | $Fe/SiO_2$ | CaO (wt %) | $Na_2O$ (wt %) | Amount of alkaline components (wt %) | Arsenic elution concentration (mg/L) |
|---|---|---|---|---|---|---|---|---|
| 31 | 11.1 | 20.9 | 21.6 | 0.97 | 21.8 | 2.6 | 24.4 | 0.95 |
| 32 | 8.7 | 24 | 25.9 | 0.92 | 17.4 | 2.8 | 20.2 | 0.74 |
| 33 | 8.6 | 1.9 | 26.4 | 0.1 | 12.5 | 13.7 | 26.2 | 7.7 |
| 34 | 9.7 | 15.6 | 28.7 | 0.54 | 20.3 | 14.8 | 35.1 | 2.6 |

INDUSTRIAL APPLICABILITY

In electrolytic refining of copper, arsenic accumulated in an electrolytic solution can be easily and inexpensively immobilized with a glass-forming material such as inexpensive copper slag, silica sand and the like. As a result, arsenic can be stably stored for a long period of time.

The invention claimed is:

1. A method for immobilizing arsenic, the method comprising:
adding an alkaline solution and an oxidizing agent to a copper-arsenic-containing substance, and thereby carrying out an oxidizing leaching;
separating a leach residue by solid-liquid separation;
adding calcium hydroxide to a recovered alkaline arsenate solution to generate calcium arsenate;
adding the recovered calcium arsenate to a glass-forming material containing iron, silica and alkaline components so that an iron/silica weight ratio is in a range of 0.5 to 0.9 and an amount of alkaline components is in a range of 14 wt % to 26 wt %, and thereby incorporating the calcium arsenate into a glass solidified body.

2. The method for immobilizing arsenic according to claim 1,
wherein the copper-arsenic-containing substance is a copper-arsenide-containing slime,
sodium hydroxide and the oxidizing agent are added to the copper-arsenide-containing slime, a mixture is heated to leach the arsenic, and meanwhile the leach residue is separated by solid-liquid separation,
calcium hydroxide is added to a recovered sodium arsenate solution to generate calcium arsenate, and
the glass-forming material is added to the recovered calcium arsenate so that the iron/silica weight ratio and the amount of alkaline components are in the ranges, and thereby incorporating the calcium arsenate into the glass solidified body.

3. The method for immobilizing arsenic according to claim 2,
wherein calcium hydroxide is added to the sodium arsenate solution to generate calcium arsenate, a solution containing the calcium arsenate is subjected to solid-liquid separation to recover the calcium arsenate, and meanwhile a filtrate containing sodium hydroxide is returned to an oxidizing leaching step to reuse the filtrate as an alkaline source for oxidizing leaching.

* * * * *